UNITED STATES PATENT OFFICE.

WILHELM CONNSTEIN, OF CHARLOTTENBURG, GERMANY, ASSIGNOR TO THE FIRM OF VEREINIGTE CHEMISCHE WERKE ACTIENGESELLSCHAFT, OF CHARLOTTENBURG, GERMANY.

PROCESS FOR THE MANUFACTURE OF THE FATTY ACIDS FROM THEIR ESTERS.

1,015,994.   Specification of Letters Patent.   Patented Jan. 30, 1912.

No Drawing.   Application filed December 26, 1905. Serial No. 293,214.

*To all whom it may concern:*

Be it known that I, WILHELM CONNSTEIN, doctor of medicine, a subject of the King of Prussia and the German Emperor, residing at 16 Salzufer, Charlottenburg, Kingdom of Prussia, German Empire, have invented new and useful Improvements in Processes for the Manufacture of the Fatty Acids from their Esters, of which the following is a specification.

In the decomposition of oils, fats and waxes into the corresponding acids and alcohols by means of vegetable ferments, the presence of an acid medium during the decomposition has been found to be necessary. This acid medium may be obtained by the addition of free acid or acid salts or by bringing together the ferment and the oils, fats or waxes without the addition of acids or acid salts and permitting the reaction of the ferment to proceed in the presence of the acid which is in time (although only very gradually) produced automatically by the mixture. In the various methods suggested for decomposing fats by means of ferments, the action is always produced by the simultaneous presence of the acid and the ferment. Now it has been found that the action in common of the ferment and acid proceeds considerably more speedily and vigorously in the presence of metallic salts than in the absence of such compounds. Any heavy metallic salts may be employed which do not precipitate albumen. The following salts have proved to be particularly suitable: sulfate of manganese, chlorid of manganese, nitrate of manganese, acetate of manganese, sulfate of iron, sulfate of aluminium, chlorid of zinc. Which of these salts should be employed, depends upon the desired rapidity of the reaction and upon the present cost price of the several salts. Salts of manganese have proved most suited for the purpose and sulfate of manganese in particular.

The process may be carried into practice in two different ways. 1. At the beginning of the operation acid substances are added to the mixture of water, fat (oil or wax) ferment and the metallic salt. 2. A mixture of water, fat (oil, wax) and metallic salt is prepared and allowed to stand. The acid required for the decomposition of the fat under the influence of the ferment is then generated in the mixture itself.

The ferment employed is the fat decomposing ferment contained in the vegetable seeds. The best ferment is that contained in the seed of the castor-oil plant. This ferment is employed by mixing castor oil seeds with water, fat and metallic salt. A mixture of the ferment with the oil may also be obtained by treating the castor oil seed with castor oil and removing the seed portions from the oil, and the mixture so obtained may be utilized for the decomposition of fat. Which of these forms the ferment is best employed in, depends upon, whether the cost of extracting the oil ferment mixture is repaid by the increased effort of the mixture as compared with castor oil seeds, or whether it is economically more advantageous to employ castor oil seeds. In the latter case it is preferable to employ the castor oil press-cake of the castor oil extracting process. The procedure is as follows:—100 kilograms of linseed oil are mixed with 30 l. of water, 2 kilograms of hulled castor oil seeds, 0.15 kilogram of acetic acid and ½ kilogram of sulfate of manganese. The mass is stirred, thereby producing an emulsion, and then allowed to stand at a temperature between 10–40° C. After 24 hours a practically complete decomposition of the oil has taken place. The fatty acid, the glycerin and the particles of seed present may be separated one from the other. The mass is expressed and washed with water. In this manner, the fatty acid and the glycerin are obtained simultaneously. In order to separate these two products one from the other, the mixture is warmed and then permitted to cool. The fatty acids then collect upon the surface of the liquid from which they are separated by running off the aqueous glycerin. The sulfate of manganese is precipitated from the glycerin by the addition of lime. The glycerin may then be purified by inspissation or by filtration over bone charcoal or by distillation.

If the sulfate of manganese were omitted in the operation, which has been described, the decomposition of the fat would be considerably slower and less complete because in the absence of metallic salts the quantity of acid added is insufficient to obtain a complete decomposition of the oil by ferment. If desired a smaller quantity of castor oil seeds may be employed. In this case also the presence of the metallic salt will hasten and facilitate the decomposition.

The hastening of the acid reaction and the formation of acid described above are dependent upon the presence of neutral metallic salts. Acid metallic salts merely act as an acid medium and it would be necessary to mix them with neutral metallic salts in order to hasten their action.

What I claim as my invention and desire to secure by Letters Patent is:—

The process of decomposition of fatty acid esters into their acids and alcohols, said process consisting in subjecting said esters, in the presence of neutral salts of the heavy metals and of acids, to the action of fat decomposing ferments present in oil- or fat-bearing plants in such amount as is insufficient for causing the complete decomposition alone.

In testimony whereof I have signed my name to this specification in the presence of two subscribing witnesses.

WILHELM CONNSTEIN.

Witnesses:
  WOLDEMAR HAUPT,
  HENRY HASPER.